United States Patent [19]
Bauhofer

[11] 3,918,801
[45] Nov. 11, 1975

[54] PLAYBACK DEVICES

[75] Inventor: Friedrich Bauhofer, Vienna, Austria

[73] Assignees: Karl Vockenhuber; Raimund Hauser, both of Vienna, Austria; a part interest to each

[22] Filed: Oct. 2, 1973

[21] Appl. No.: 402,825

[30] Foreign Application Priority Data
Oct. 3, 1972 Australia.............................. 8461/72

[52] U.S. Cl. ....................... 352/72; 352/31; 352/8; 352/22; 352/78 C
[51] Int. Cl.[2] ......................................... G03B 23/02
[58] Field of Search ............ 352/6, 7, 8, 31, 32, 33, 352/78 C, 133, 22, 72

[56] References Cited
UNITED STATES PATENTS

| | | | |
|---|---|---|---|
| 3,120,781 | 2/1964 | Babcock | 352/72 |
| 3,312,158 | 4/1967 | MacMillin | 352/78 C X |
| 3,383,156 | 5/1968 | Fried | 352/8 X |
| 3,464,765 | 9/1969 | Broeckl | 352/72 |
| 3,498,702 | 3/1970 | Meninger | 352/31 X |
| 3,498,703 | 3/1970 | Gerry | 352/72 X |
| 3,601,025 | 8/1971 | Stieringer | 352/72 X |
| 3,625,125 | 12/1971 | Iida | 352/72 |
| 3,666,361 | 5/1972 | Pankow | 352/78 C |
| 3,669,532 | 6/1972 | Figge | 352/78 C |
| 3,672,752 | 6/1972 | Young | 352/72 |

*Primary Examiner*—Monroe H. Hayes
*Attorney, Agent, or Firm*—Ernest G. Montague; Karl F. Ross; Herbert Dubno

[57] ABSTRACT

A film projector, adapted to receive separate sound and film cassettes which are to be played together, is provided with a system for reading code marks on the cassettes before projection commences; this system has an output, which may be visual or automatically effective to exert an overriding control on the projector, if the code markers of the cassettes do not correspond. In this way the risk of playing the wrong sound track for a particular film is avoided. Also described are means for enabling differently shaped cassettes to be used, if desired, for the sound and film tracks.

15 Claims, 12 Drawing Figures

PLAYBACK DEVICES

BACKGROUND OF THE INVENTION

My present invention relates to message-reproducing apparatus, specifically a sound-film projector using separate picture and sound carriers which are disposed in respective cassettes.

In dual-strip reproduction in which the image and sound media are separated from each other it is necessary, particularly when projecting motion-picture films with sound accompaniment, to check the agreement of the sound program with the film program. This has necessitated adopting an awkard procedure of initially viewing the beginning of the film and then listening to the beginning of the sound recording in order to determine, after recognizing the contents of the two programs by reference to memory, whether the two strips are or are not in fact intended for each other. It is of course possible to provide a remedy by simply marking the storage containers for both strips. However, in view of the prevailing darkness during the performance of a motion-picture film this can lead to difficulties because it is virtually impossible to read the inscription or, when displaying several strips, to be always certain that each strip is correctly deposited in an inscribed container.

THE STATE OF THE ART

Numerous devices have been proposed, especially for use with motion-picture equipment, for the purpose of encoding cassettes in which message carriers are stored. For example, Austrian patent No. 278,527 describes a circuit in a narrow-gauge-film apparatus for detecting different specific data of the film, such as the frame frequency which is to be selected or the instant when sound-reproduction amplifiers are to be switched on. However, this apparatus gives information only in relation to the actual contents of the strip which is stored in the cassette, and tells the operator nothing about whether a particular sound cassette is the correct one for using with a particular film cassette.

OBJECT OF THE INVENTION

An object of the invention is to provide a device by means of which sound and film cassettes can be correctly matched to one another without visual inspection or trial and error.

SUMMARY OF THE INVENTION

In accordance with the present invention I provide a message-reproducing apparatus, specifically a motion-picture projector, with loading means accommodating a pair of associated data-carrying cassettes, i.e. a picture cassette and a sound cassette, these cassettes exhibiting distinctive markings in predetermined code positions. Upon insertion of the cassettes into the body of the apparatus, in operative juxtaposition with respective reading means, their markings are respectively detected by first and second sensors which are connected to a comparator for ascertaining the presence of a predetermined correlation — such as a distribution in identical patterns — between the code markings of the picture and sound cassettes. In the absence of such correlation, the comparator actuates signaling means designed to indicate a mismatch, either by alerting the operator or by actuating an inhibitor to prevent the use of the projector. The loading means may comprise a cassette holder provided with closable cover means carrying all or part of the sensors. The sensors may be mechanical, electrical or optical; in the latter instance they may be constituted by a photoelectric scanning system forming two separate light paths for detecting markings of distinctively different light-transmission characteristics on the respective cassettes.

In carrying out the invention, I may use either of two techniques for scanning the code markers on both cassettes. According to the first technique a sensor such as a brush or spring contact is provided for each code position on the cassettes, the output signal from each sensor of one cassette being compared with the output signal of the corresponding sensor adapted to scan the associated code position on the other cassette for identity and thus correct selection. The second technique is to provide each cassette with a single sensor for scanning the code markers thereof; corresponding code markers on a presumed pair of cassettes move simultaneously past the respective sensors (or vice versa) while the outputs thereof are compared. A diversity of signals emitted by the sensors indicates a mismatch between the selected pair of cassettes.

In carrying out the first of these alternatives I prefer to provide a lid, serving to close a space adapted to receive one or more cassettes, with contact members for scanning the code markers on the cassettes, the contact members being automatically engaged by the code markers as the lid is closed. The position of the cassette is automatically maintained as long as the lid is in closed position. The lid may assist the retention of the cassettes in their operating position and/or serve to prevent the ingress of dust into a reading device for data contained on the cassetted strip. A number of cassette-receiving spaces or compartments may be provided, each having a lid with a sensing contact for the cassette which is inserted into the space. However, I may also provide a common receiving space for several cassettes while equipping the lid thereof with the necessary number of contact members assigned to all code positions on the cassettes.

In practicing the second above-mentioned scanning procedure I prefer to dispose the several code-marker sensors on a common support which moves relative to the code markers of the cassettes when they are inserted into the projector. The motion of the support may be controllable, for example, by a mode-selector switch or by a lid which closes the cassette-receiving space. In that case only a single sensing element needs to be provided for scanning the code markers of each cassette.

Scanning of the code positions may also be accomplished in a simple manner with the help of the aforementioned lid if the same is arranged for joint movement of the sensors past the several positions during closing motion of the lid. If a plurality of cassette-receiving spaces each having its own sensor-carrying lid are provided, it is necessary that these lids be interconnected for joint motion. The cassettes could also move individually and independently past a scanning device but this would require the presence of a storage system adapted to preserve the signals produced by the scanned cassettes.

In a particularly simple embodiment of my invention, the scanning means for reading the code markers of the cassettes are disposed in the zone of an inlet to a chamber accommodating a cassette holder.

If the code markers have different absorption or reflection characteristics, a light beam reflected by a code marker on either cassette is directed toward a photocell followed by a threshold switch such as a tunnel diode. This produces three current values of different magnitudes in accordance with the photocell output depending on the number of markers (zero, one or two) simultaneously detected by the scanning means.

If desired, means may be provided which sense the shape of the cassettes in order to deactivate the aforementioned signaling means upon detecting cassettes of a predetermined configuration not provided with code markers. This enables the apparatus operator to utilize cassettes which are unsuitable for supporting code markers but which are distinguished from the cassettes with code markers by the presence of a characteristic physical feature.

BRIEF DESCRIPTION OF THE DRAWING

The invention will now be described in more detail, by way of example, with reference to the accompanying drawing in which.

In the following description corresponding parts of different embodiments are correspondingly referenced for simplicity.

SPECIFIC DESCRIPTION

Figure 1:
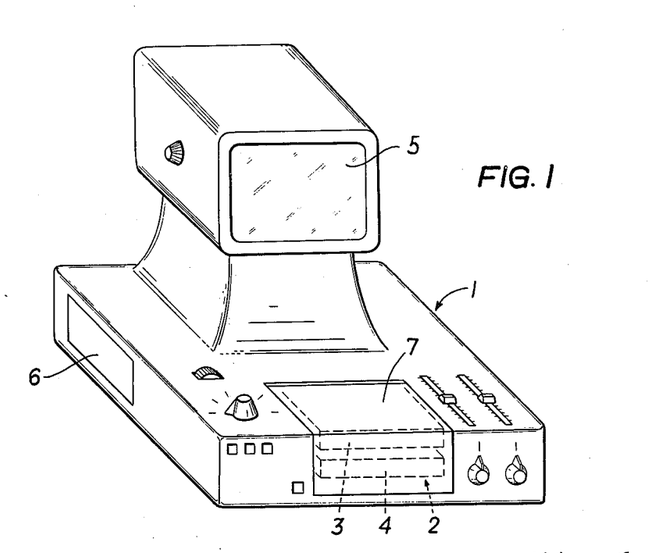
FIG. 1 is a diagrammatic perspective view of a sound-film projector according to my invention, adapted for cassette loading.

In FIG. 1 I have shown a film projector with a holder providing a receiving space 2 for manually loadable film cassette 3 and a sound cassette 4. A projection device, not shown but of a type well-known per se, produces an image of the film on a ground-glass screen 5 while the associated sound is emitted from a loudspeaker 6. The cassette-receiving space 2 is closable by a lid 7, shown in detail in FIGS. 2A and 2B.

The cassettes 3 and 4 are separated in the receiving space 2 by a partition 8 and, when inserted, coact with respective reading units 9, 10. When the lid 7 is closed, a leaf spring 11 (FIG. 2B) holds the two cassettes in their inserted positions. One side wall of each of the cassettes 3 and 4 is provided with code positions 12a to 12d (collectively designated 12 in FIG. 2A) and 13a to 13d (collectively designated 13), respectively. The code positions 12a to 12d are associated with spring-biased, current-carrying scanning contacts 14a to 14d (collectively designated 14) mounted on the lid 7 and, similarly, the code positions 13a to 13d are associated with spring-biased current-carrying contacts 15a to 15d (collectively designated 15) mounted inside the holder 2 of the projector 1. The holder is also provided with contact plates 16 and 17 alternately engageable by any sensing contact 14 or 15 depending on whether or not a cassette is inserted and bears a raised marker in the corresponding code position.

Figure 2A:
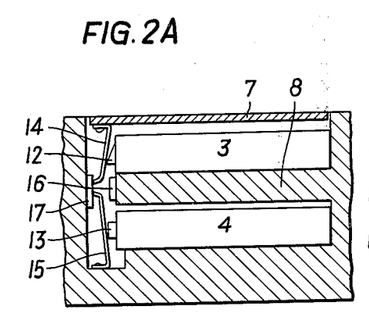
FIG. 2A shows a section through a cassette holder of FIG. 1 as viewed from the front with the front part of the lid removed.
Figure 2B:
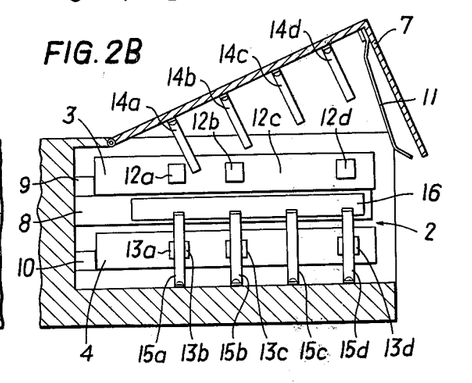
FIG. 2B is a section through the cassette holder as viewed from the left-hand side of FIG. 1, showing the lid in a partially raised position.

The code positions 12a, 12d and 12d, 13a, 13b and 13d of the cassettes are provided with markings in the form of cam-shaped bosses by means of which the spring contacts 14a, 14b 14d and 15a, 15b, 15d are thrust against the respective contact plates 17 whereas the feelers 14c and 15c are retained in their inoperative position on the associated contact plate 16 as no bosses are provided at their positions. A current path is established via the contact plates 16 by the associated feeler pairs 14a, 15a; 14b, 15b as the contents of each pair are resiliently flexed against the same contact plate.

Figure 3:
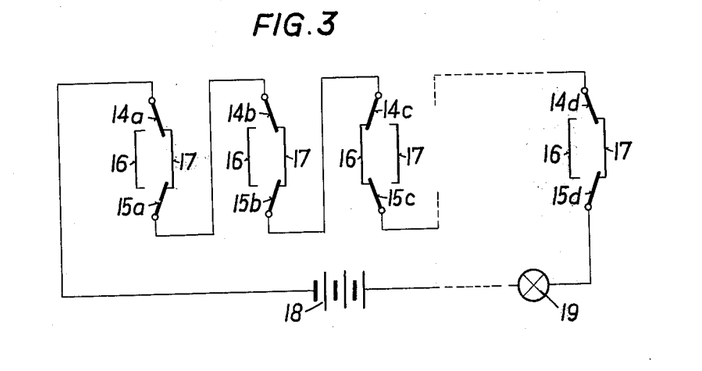
FIG. 3 shows the principal parts of a series electrical circuit utilized with the projector of FIGS. 1, 2A and 2B.

FIG. 3 shows the electrical comparison circuit associated with FIGS. 2A and 2B. The contact feelers 14a to 14d and 15a to 15d are shown diagrammatically as switches while the contact tracks 16 and 17 are shown as conductors between the individual switch pairs. The system is provided with current from a voltage source 18, and with an indicating device 19 in the form of a lamp in series therewith.

If cassettes 3 and 4 are inserted into the apparatus 1 and the spring contacts 14 and 15 are engaged with the bosses constituting the code markers as shown, current will only flow through the circuit if the cassettes are correctly associated with each other. In this condition the lamp 19 is illuminated and indicates the correct co-ordination of the cassettes to the operator of the apparatus. If the cassettes which are inserted into the apparatus are not properly matched, the coding will differ in at least one code position, the corresponding switches 14 and 15 are held against different contact plates and the circuit is interrupted. The lamp 19 will therefore not be illuminated. A control relay or some other functional element may of course be provided in place of the lamp 19. It is also not essential that the indicator should respond when the cassettes are correctly matched; alternatively, it could come into operation when uncoordinated cassettes are inserted into the apparatus.

Figure 4A:
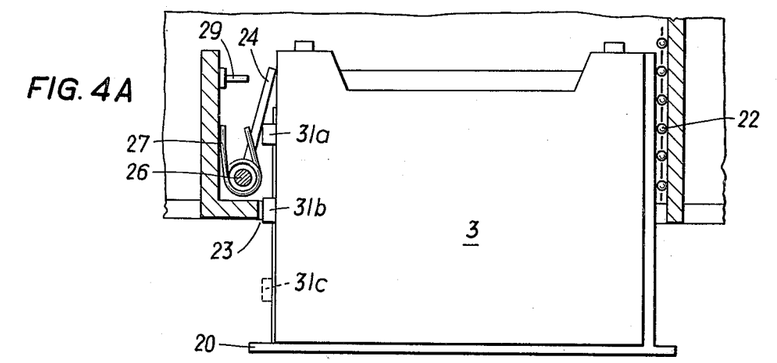
FIG. 4A is a plan view, partly in section, of a second embodiment of my invention, comprising a cassette holder in the form of a sliding drawer.
Figure 4B:
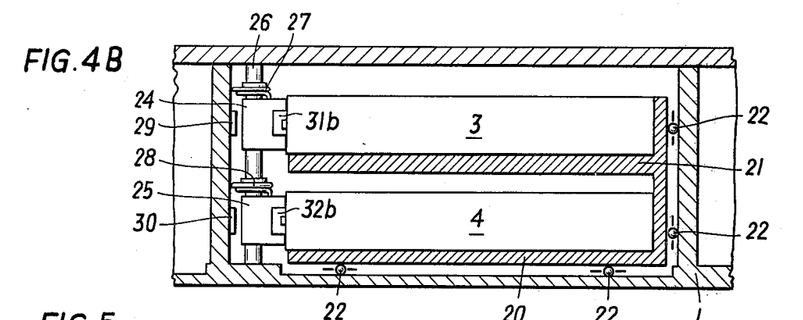
FIG. 4B is a vertical section of the holder shown in FIG. 4A.

FIGS. 4A and 4B show a system in which a single pair of scanning elements or sensors is associated with the cassettes 3 and 4. A cassette holder 20, formed as a sliding drawer, has upper and lower compartments for two cassettes 3 and 4, respectively, the two spaces being separated by a partition 21. The holder 20 itself is insertable into the apparatus on roller tracks 22. Two feelers 24, 25 are pivotally supported on a common shaft 26 in the zone of an inlet aperture 23 for the holder 20 in the projector and are brought to bear by means of hairpin springs 27, 28 against those sides of the cassettes 3 and 4 which support the code markers. Switches 29, 30, which can be actuated by the feelers 24 and 25, are provided inside the projector opposite the side walls of the cassettes 3 and 4 carrying the code markers.

The method of operation of this system is as follows:

After proper positioning of the cassettes 3 and 4 in the holder 20 the latter is inserted into the projector 1 whereby the cam-shaped code markers thereon are moved past the feelers 24 and 25. The code marker 31a on cassette 3 and a non-illustrated mate on cassette 4, as well as a similar pair 31b and 32b, simultaneously engage the feelers 24 and 25 so that these simultaneously operate the switches 29 and 30. Thus a circuit through these switches is completed by the concurrent closure of these switches. Suppose now a code marker 31c on the cassette 3 (FIG. 4A) is not associated with a corresponding code marker on the cassette 4; in that case only the switch 29 will be operated when the loading device 20 is slid past the feelers 29, 30 and this can be used to indicate the incorrect coordination of the two cassettes.

Figure 5:
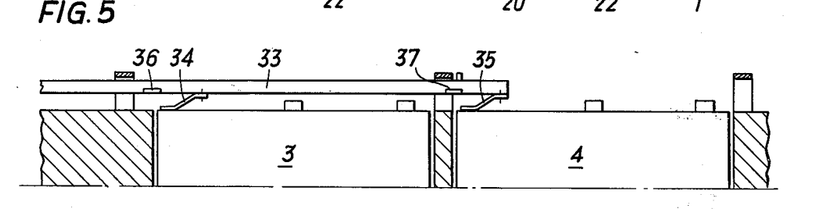
FIG. 5 shows a first modification of the cassette holder of FIGS. 4A and 4B, only part of the cassette holder being shown for the sake of simplification.

FIG. 5 shows an assembly for tracing the code markers which is similar to the system illustrated in FIGS. 4A and 4B. In this modification, after the cassettes 3 and 4 are inserted through an aperture into respective spaces in the apparatus 1, a cover slide 33 is slid across the cassette aperture. The slide 33 is provided for each cassette with a spring-biased contact feeler 34 or 35, respectively, the feeler 34 being associated with the cassette 3 and the feeler 35 being associated with the cassette 4. The code markers of the cassettes are formed as cams mounted on their rear surfaces so that progressive closure of the inlet aperture for the cassettes by the slide 33 causes the feelers to engage successive markers. The feelers 34, 35 coact with current-carrying contact plates 36 and 37 spaced apart on the slide. When the slide is moved past the code markers, the feelers 34 and 35 engage simultaneously the associated code markers so that if the cassettes are properly matched the contact tracks 36 and 37 are either simultaneously connected or simultaneously open-circuited by the feelers 34 and 35. A failure of one feeler to engage a cam marker simultaneously with the other can be used to signify a mismatch between the cassettes by a simple electrical circuit. The feelers 34 and 35 may, if desired, be moved past the code markers by a common support that is not constructed as a cover but instead is design as a mode-selector switch which is sequentially shifted to the positions of the different code markers.

Figure 6:
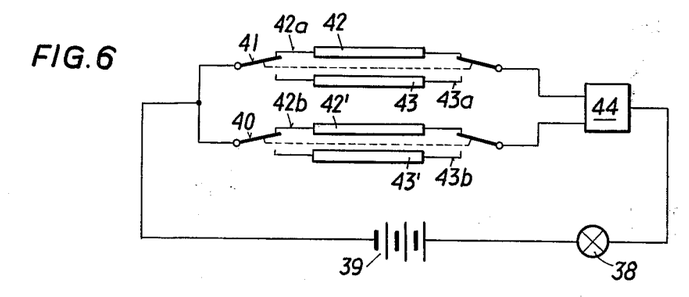
FIG. 6 is a simplified circuit diagram of control circuitry usable with the arrangement shown in FIGS. 4A, 4B and 5.

FIG. 6 shows a circuit diagram which can be utilized for evaluating the signals from the scanning feelers shown in FIGS. 4A, 4B and 5. As in the system according to FIG. 3, an indicating device 38 is connected in series with a voltage source 39.

Two parallel-connected movable ganged contact pairs 40, 41 represent the switches 29, 30 in FIGS. 4A, 4B or the switches 34 and 35 in FIG. 5. When cassettes are correctly matched, the ganged contact pairs 40 and 41 connect the voltage source 39 either to a pair of branch leads 42a, 42b, including two resistors 42, 42' of the same magnitude, or to a pair of leads 43a, 43b, including two resistors 43, 43' also of the same magnitude. The resistance value of the resistor 42 differs, however, from the resistance value of the resistor 43. When the contact pairs 40, 41 are connected to the branches 42a, 42b, two identical signals are supplied to an inverting Exclusive-OR (XOR) element 44 which follows the two branches. The characteristics of the XOR element 44 are such that an output signal is delivered when identical input signals are received. The lamp 38 will then respond to indicate to the operator that the cassettes are correctly paired with each other. No output signal is obtained if the two contact rails are connected to resistances of different magnitudes since in that case the two input signals for the XOR element 44 will be different and lamp 38 will not be illuminated. Thus, during insertion of the slide 33 or the holder 20 the lamp 38 will extinguish if the markers of the two cassettes do not correspond. This indicates to the operator that the inserted cassettes are not a matched pair. It is also possible to reverse this arrangement so that the lamp lights only if cassettes are mismatched, the XOR element 44 then delivering a signal when the two input signals are different.

Figure 7:
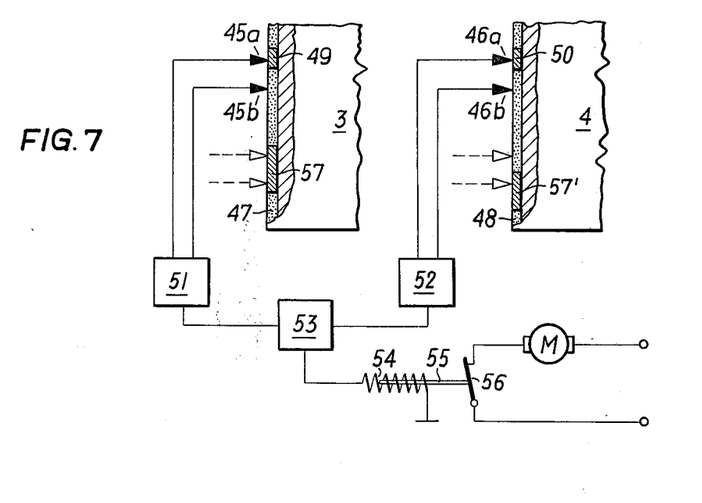
FIG. 7 shows a second modification of the cassette holder of FIGS. 4A and 4B, the cassette being differently constructed and contacts being used to control the operation of an electric motor by way of a logic circuit.

FIG. 7 shows a system in which code markers on the cassettes are scanned by purely electrical sensing and comparison means. The cassette 3 is associated with contacts 45a, 45b and the cassette 4 is associated with contacts 46a, 46b. The cassettes 3 and 4 themselves are provided on one side wall with an electrically insulating film 47 or 48, respectively, into which individual conductive code markers are embedded. In the illustrated position the contacts 45a and 46a bear upon a pair of conductive code markers 49 and 50, respectively, while the contacts 45b and 46b engage the nonconductive film. The signals of the contacts 45a and 45b or 46a and 46b are supplied to respective AND elements 51, 52 which, in the illustrated example, supply an identical output signal to a noninverting XOR element 53. The characteristics of the XOR element 53 are such that no output signal is delivered when identical input signals are received. Accordingly, an electromagnet 54 remains de-energized and its armature 35 disposed in a coil 54 maintains a switch 56 in a motor circuit in the closed position.

If the cassettes 3, 4 are concurrently displaced, relative to the position of the contact pairs 45a 45b or 46a, 46b, these contacts will assume the position shown in broken lines in FIG. 7. In this position the contacts 45a 45b confront a conductive code marker 57 while the contact 46a of the second pair faces non-conductive material. The remaining contact 46b touches, however, the conductive code marker 57'. Different signals are therefore obtained at the outputs of the two AND networks 51, 52, the XOR network produces an output signal, the armature 55 of the electromagnet 54 is energized and the motor circuit is opened via the switch 56. This means that the apparatus 1 cannot be operated.

Figure 8:
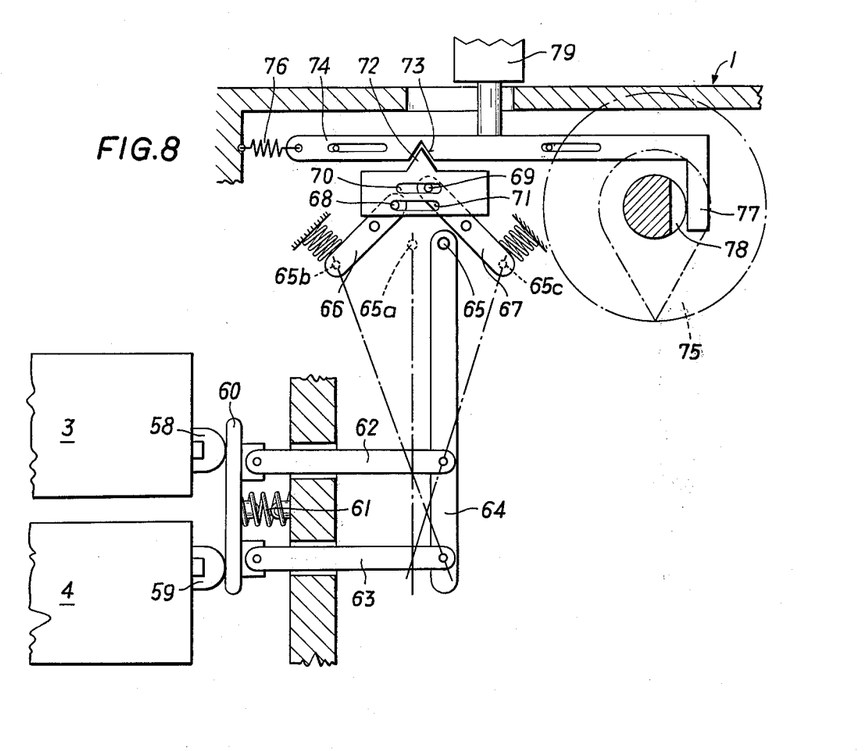
FIG. 8 shows another embodiment using a mechanical capacitor for checking whether a pair of cassettes containing sound and film carriers are intended to be played together.

The system illustrated in FIG. 8 shows a purely mechanical assembly for scanning and coupling projecting code markers on cassettes. A feeler plate 60 registers with respective code markers 58 and 59 on two cassettes 3 and 4. The feeler plate 60 is biased toward the code markers by a compression spring 61. Two slides 62, 63, which are hinged to the plate 60, are disposed opposite the positions of the code markers 58, 59 and are also hinged to a control rod 64. The centrally fulcrumed levers 66 and 67, which are swingable independently of each other and are kept apart by springs, are disposed in the zone of a stud 65 carried by the rod 64. A pin 68 on the lever 66 and a pin 69 on the lever 67 are disposed in respective slots 70, 71 of a ratchet plate 72, the slots being disposed parallel to each other. The ratchet plate 72 is retained by the biasing springs of the levers 66, 67 in engagement with a notch 73 of a detent 74 of a selector switch 75 having a groove 78 in its spindle. The detent 74 is biased by a tension spring 76 in a locking direction but is retained in its releasing position, which does not lock the selector switch 75, by the engagement of the ratchet 72 with the notch 73. A transverse arm 77 is provided on the free end of the detent 74.

The method of operation of this system will be explained hereinbelow. If both cassettes 3 and 4 are provided with code markers 58 and 59 at the same code position, the control rod 64 together with its stud 65 will be retained in the illustrated position by the plate 60 via the slides 62, 63, the stud 65 remaining out of engagement with the levers 66 and 67. The stud 65 also does not engage these levers in its position 65a which it assumes when no code markers are present on the cassettes. The detent 74 is therefore held by the ratchet plate against displacement and mode-selector switch 75 is free to rotate because the cassettes are matched as evidenced by their identical code patterns.

However, if one of the two cassettes has no code marker, the plate 60 will assume a position inclined to that shown, which results in a tilting of the control lever 64. The stud 65 then engages either the lever 66 (position 65b) or the lever 67 (position 65c), thereby lifting the ratchet plate 72 out of the notch 73 with either the pin 68 or the pin 69. The force of the spring 76 shifts the detent 74 to the left until its latch arm 77 enters into the groove 78 of the mode-selector switch 75 to lock it against rotation. The projector cannot, therefore, be started. A handle 79 on the detent 74 extends from a housing wall of the projector 1 in order to enable the selector switch 75 to be manually unlocked. When the handle 79 is moved to the right, the selector switch is again released by the detent 74 and the ratchet plate 72 is again able to pivot into the notch 73 when the wrong cassette is replaced by the right one.

Figure 9:
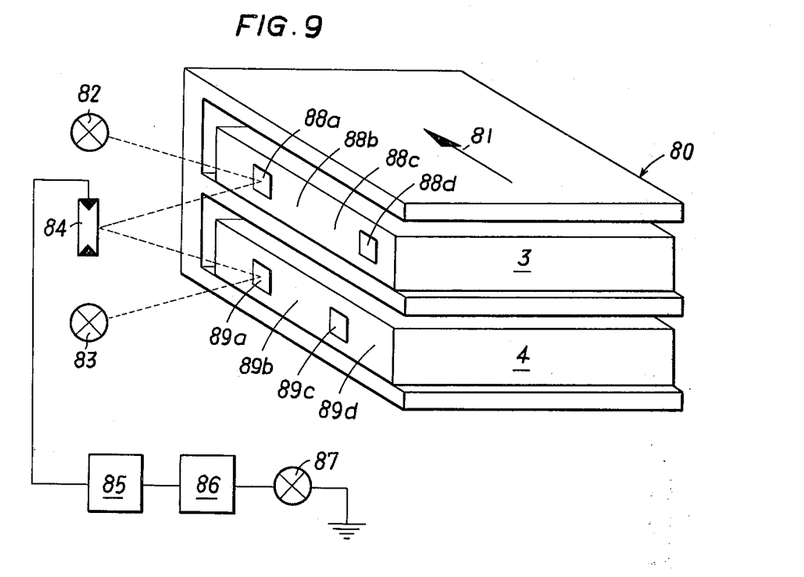
FIG. 9 shows a further embodiment in which identity between a pair of cassettes is determined optically.

In the embodiment of FIG. 9 the cassettes 3 and 4 are located in their respective positions in a cassette holder 80. One of the side walls of each cassette is provided with light-reflecting markers in certain of their four code positions 88a – 88d. These code positions are illuminated, in consecutive pairs, by lamps 82, 83 when the holder 80 is loaded into the projector in the direction of the arrow 81. The light reflected by the markers impinges upon a photocell 84 which is connected via an amplifier 85 to a threshold switch 86. The output of the threshold switch is connected to an evaluating device, for example a lamp 87. The threshold switch 86 has a characteristic which enables a signal to be emitted above or below a defined voltage-threshold range but no signal is emitted at a voltage which has a value lying within that range. Such a system can be realized by means of a conventional tunnel diode, e.g. of the kind disclosed in the German printed specification No. 1,164,567.

A signal of maximum amplitude, causing the lamp 87 to be lit, is produced in the threshold switch 86 if the light of the lamp 82 as well as the light of the lamp 83 impinges on the photocell through incidence on the reflecting markers 88a, 89a. The lamp 87 is likewise lit when the code position 88b, 89b is scanned. No light-reflecting markers are present at these code positions and accordingly the photocell 84 does not receive any light. The voltage remains below a predefined limit and the threshold switch 86 again delivers a signal for the lamp 87.

Evaluation at the code positions 88c, 89c or 88d, 89d produces a different result. In these cases light is supplied to the photocell 84 from only one code marker so that the value of the output signal is within the specified range. The threshold switch 86 then does not deliver any signal and the lamp 87 remains dark. The two cassettes are therefore not intended to be played together.

It is of course also possible that a film or a recording tap is to be played in the projecting apparatus without being disposed in a cassette which is suited for the application of code markers. The use of such a cassette together with a cassette with code markers in the systems described hereinabove would either indicate faulty operation or prevent the apparatus from being operated although the contents of both cassettes are intended to be played together.

Figure 10:
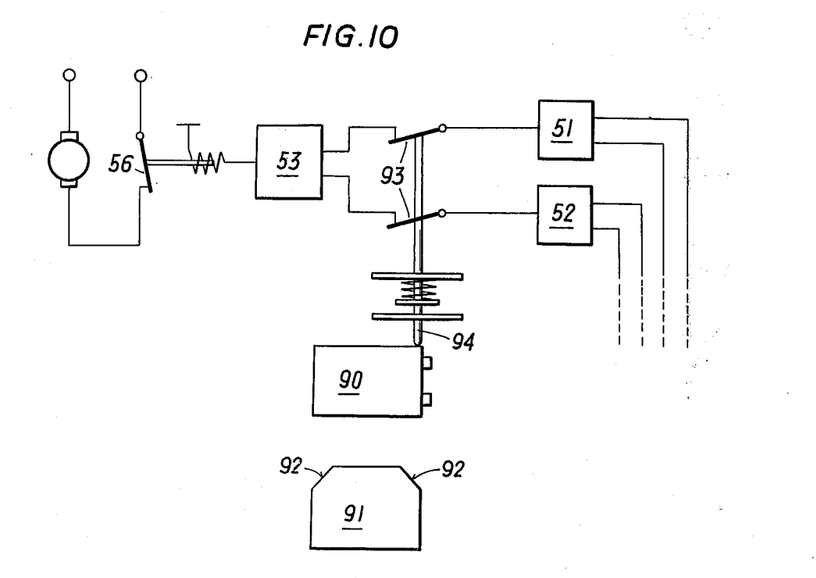
FIG. 10 shows an electro-mechanical circuit designed to enable the circuit of FIG. 7 to be used with paired cassettes of different configurations.

In order to avoid this disadvantage, FIG. 10 discloses a system by means of which it is possible to use cassettes of different as well as of identical kind, cassettes with code markers being simultaneously tested as to whether or not they are associated with each other. This system proceeds on the assumption that the cassettes of different kind have some characteristic feature which cassettes with code markers do not possess. In the system illustrated in FIG. 10 a cassette 90 with code markers differs from a cassette 91 by virtue of the fact that the last-mentioned cassette has chamfered corner portions 92. The scanning system for detecting matching cassettes 90 is substantially the same as that illustrated in FIG. 7 and need not therefore be explained in detail. However, a switch for each conductor branch is provided between the AND networks 51, 52 and the XOR network 53 of FIG. 7, these switches being designated 93 in FIG. 10 and being kept in the closed position by a probe 94 when cassettes 90 are used. The operation of the sensing and comparison circuit proceeds therefore in the manner described with reference to FIG. 7.

However, if cassettes 91 are inserted into the apparatus that have no code markers it will be necessary to deactivate the circuit of FIG. 7 in order to enable the apparatus to be operated. As the probe 94 senses a chamfered portion 92 it opens the switches 93 so that the connection between the AND networks 51, 52 and the XOR network 53 is interrupted. If a cassette 90 with code markers is inserted into the apparatus together with a cassette 91, a signal produced by the code markers on the cassette 90 then has no effect on the condition of the XOR network 53. The input signal for the XOR network is zero for both conductor branches when the interruptor switch 93 is opened so that the motor switch 56 remains closed and the apparatus can be operated.

Numerous other embodiments of my invention are possible which may differ both in terms of circuit technology and mechanically for the systems specifically disclosed above. A further advantage of this invention is the fact that it enables the operator to determine not only the correct coordination of the cassettes on playback but also whether the cassettes are correctly inserted into the playback position. This is advantageous because badly inserted cassettes may result in damage to the data carrier if the drive is nevertheless started. A discriminating device may therefore be provided to indicate whether a wrong cassette has been inserted into the projection apparatus or if the correct cassette has merely been incorrectly positioned therein.

I claim:

1. In a motion-picture projector having reading means for concurrently reproducing the contents of a picture strip and a sound strip respectively stored in a pair of associated cassettes, in combination:

a manually loadable cassette holder receivable in the body of the projector for accommodating a picture cassette and a sound cassette in operative juxtaposition with said reading means upon insertion of said holder into said body, said cassettes being provided with distinctive markings in predetermined code positions;

first and second sensing means positioned to detect said markings of said picture and sound cassettes, respectively;

comparison means responsive to said first and second sensing means upon insertion of said holder into said body for ascertaining the presence of a predetermined correlation between the code markings of said picture and sound cassettes; and signaling means connected to said comparison means for indicating the absence of said correlation.

2. The combination defined in claim 1 wherein said holder is provided with cover means closable to retain said cassettes therein, said first and second sensing means being mounted at least in part on said cover means for engagement with corresponding markings upon closure of said cover means.

3. The combination defined in claim 2 wherein said sensing means include a first set of contacts on said holder and a second set of contacts on said cover means positioned to complete an operating circuit for said signaling means upon engagement with respective markings distributed in correlated patterns on said cassettes.

4. The combination defined in claim 2 wherein said first and second sensing means comprise a pair of contact elements on said cover means positioned for concurrent scanning of successive pairs of corresponding code positions of said cassettes upon relative displacement of said holder and said cover means toward a closure position.

5. In a motion-picture projector having reading means for concurrently reproducing the contents of a picture strip and a sound strip respectively stored in a pair of associated cassettes, in combination:

a manually loadable cassette holder receivable in the body of the projector for accommodating a picture cassette and a sound cassette in operative juxtaposition with said reading means upon insertion of said holder into said body, said cassettes being each provided with a plurality of predetermined code positions occupied at least in part by distinctive markings;

first and second sensing means provided with a support movable relatively to said holder for sequentially scanning the code positions of said picture and sound cassettes, respectively, to detect said markings during relative motion of said holder and said support;

comparison means responsive to said first and second sensing means upon insertion of said holder into said body for ascertaining the presence of a predetermined correlation between the code markings of said picture and sound cassettes; and signaling means connected to said comparison means for indicating the absence of said correlation.

6. The combination defined in claim 5 wherein said body has an inlet for said holder, said support being placed adjacent said inlet with said first and second sensing means disposed thereon for sequentially scanning said code positions during insertion of said holder into said inlet.

7. The combination defined in claim 5 wherein said signaling means comprises inhibiting means for preventing operation of the projector in the absence of said correlation.

8. The combination defined in claim 7 wherein said inhibiting means comprises a mechanical detent.

9. The combination defined in claim 5 wherein said first and second sensing means comprise photoelectric scanning means forming separate light paths for detecting markings of distinctively different light-transmission characteristics on the respective cassettes.

10. The combination defined in claim 9 wherein said comparison means comprises a threshold switch discriminating between three voltage levels for determining the number of markings concurrently detected by said scanning means.

11. The combination defined in claim 10 wherein said threshold switch is a tunnel diode.

12. In message-reproducing apparatus having means for jointly reading the contents of two data carriers respectively stored in a pair of associated cassettes, in combination:

a manually loadable cassette holder receivable in the body of the apparatus for accommodating a first and a second cassette in operative juxtaposition with the respective reading means, said cassettes being provided with a plurality of predetermined code positions occupied at least in part by distinctive markings;

first and second sensing means provided with a support movable relatively to said holder for sequentially scanning the code positions of said first and second cassettes, respectively, to detect said markings during relative motion of said holder and said support;

comparison means responsive to said first and second sensing means upon insertion of said holder into said body for ascertaining the presence of a predetermined correlation between the code markings of said first and second cassettes; and signaling means connected to said comparison means for indicating the absence of said correlation.

13. The combination defined in claim 12 wherein said body has an inlet for said holderrr, said support being placed adjacent said inlet with said first and second sensing means disposed thereon for sequentially scanning said code positions during insertion of said holder into said inlet.

14. In a motion-picture projector having reading means for concurrently reproducing the contents of a picture strip and a sound strip respectively stored in a pair of associated cassettes, certain cassettes being provided with distinctive markings in predetermined code positions to indicate their pairing, other cassettes lacking said markings and having a configuration different from that of cassettes provided with said markings, in combination:

receiving means on the body of said projector provided with an inlet for a picture cassette and a sound cassette to be operatively juxtaposed with said reading means;

first and second sensing means at said inlet positioned to coact with markings on said picture and sound cassettes, respectively;

comparison means responsive to said first and second sensing means upon insertion of a picture cassette and a sound cassette into said inlet for ascertaining the presence of a predetermined correlation between the code markings thereof;

signaling means connected to said comparison means for indicating the absence of said correlation; and shape-detecting means at said inlet responsive to said different configuration for deactivating said signaling means upon insertion of a cassette lacking said markings.

15. In message-reproducing apparatus having means for reading the contents of a data carrier stored in a cassette, in combination:

receiving means on the body of said apparatus provided with an inlet for the insertion of a cassette in operative position, said cassette being provided with a plurality of predetermined code positions occupied at least in part by distinctive markings;

sensing means provided on said body adjacent said inlet for sequentially scanning said code positions to detect said markings during insertion of the cassette and to convert the detected markings into a first series of code signals;

reference means for providing a second series of code signals;

comparison means connected to said sensing means and to said reference means for ascertaining the presence of a predetermined correlation between said first and second series of code signals; and output means connected to said comparison means for indicating said correlation.

* * * * *